2,938,806
METALLIZED CERAMICS

Pasquale C. Padula, Latrobe, Pa., assignor to The Carborundum Company, Niagara Falls, N.Y., a corporation of Delaware No Drawing. Filed May 8, 1959, Ser. No. 811,785

4 Claims. (Cl. 106—1)

This invention relates to metallized ceramics and, more particularly, to an improved composition for metallizing a ceramic body in order to join the ceramic body with another ceramic or metal component and to the metallized product.

In recent years, there has been an increasing demand for products consisting of ceramic and metal components hermetically sealed together. For example, the development of magnetrons operating in the higher frequency ranges and with higher power outputs necessitated the use of ceramic output windows because, under such conditions, the glass windows commonly used softened and eventually imploded. A ceramic window will withstand these conditions. However, in order to successfully utilize ceramic windows, they must be hermetically sealed to the metal components. Such a seal has been produced by metallizing the ceramic component and soldering or brazing the metallized portion to the metal component.

Originally, this seal was produced by the so-called Telefunken process. The metallizing composition used was essentially molybdenum powder with a small amount (about 2% of the composition) of iron powder added thereto. This composition was bonded to the ceramic material by sintering the coated ceramic in a hydrogen-nitrogen atmosphere at temperatures of 1330–1340° C. for about 30 minutes.

Subsequently, a modified Telefunken process was developed and widely used in which the metallizing composition consists of manganese and molybdenum powders. While this composition produces a somewhat better bond, it still requires sintering in dangerous and expensive atmospheres at temperatures of 1250–1350° C.

My invention provides a metallizing composition which can be bonded to a ceramic body at lower sintering temperatures and in less dangerous and less expensive atmospheres than heretofore used. Furthermore, the bond between the ceramic and metallizing composition has greater strength than that produced by the molybdenum-manganese composition discussed above. It is particularly advantageous on high refractory ceramic materials such as materials having an alumina content greater than 85%.

I have found that the addition of cuprous oxide ($Cu_2O$) to molybdenum boride produces a metallizing composition which can be sintered at lower temperatures than those heretofore used. However, such a composition produces a bond of inadequate strength. I have also found that the addition of manganese, as a metal and in the form of the oxide, markedly improves the bond strength and the vacuum tightness. Moreover, the expensive and dangerous hydrogen-nitrogen atmospheres used in sintering other metallizing compositions are not required. A protective atmosphere such as is produced by passing a stream of air through a bed of hot charcoal produces satisfactory results. Other reducing or non-oxidizing atmospheres likewise may be used. I have also found that the metallization process is less sensitive to the normal production variations of temperature, atmosphere and heating rate when my composition is used. Thus, good coated ceramics may be produced with greater facility and reliability.

The highly advantageous results mentioned above can be obtained with compositions falling within the following ranges:

| | Percent |
|---|---|
| Molybdenum boride | 40–70 |
| Cuprous oxide | 5–30 |
| Manganese powder | 5–30 |
| Manganese dioxide | 0–15 |

More specifically, for metallizing a 96% alumina ceramic, I prefer the following composition:

| | Percent |
|---|---|
| Molybdenum boride | 60 |
| Cuprous oxide | 15 |
| Manganese powder | 15 |
| Manganese dioxide | 10 |

The above composition is milled for 48 hours in a ceramic lined ball mill using hard alumina balls. Also included during the milling is an organic binder and thinner, such as a cellulose nitrate binder and acetone. The ratio of binder to thinner may be varied to obtain the viscosity desired for the particular method of application to be used. The composition prepared in this manner may be applied to the area to be metallized by brush painting, dipping, printing, spraying, silk screening or transfer rolling, all of which can be performed at room temperature.

The coated ceramic is then sintered at 2100° F.–2350° F. (about 1150° C.–1285° C.) in a reducing protective atmosphere. As previously stated, the atmosphere may be the type of gas produced by passing a stream of air through a bed of hot charcoal. The typical composition of such gas is as follows:

| | Percent |
|---|---|
| Nitrogen | 64.5 |
| Carbon monoxide | 32.0 |
| Hydrogen | 2.0 |
| Carbon dioxide | 1.0 |
| Methane | 0.5 |

An alternative atmosphere which can be used is the sort of gas obtained through the exothermic cracking of natural gas, which has a typical analysis as follows:

| | Percent |
|---|---|
| Nitrogen | 66.0 |
| Hydrogen | 18.0 |
| Carbon monoxide | 12.0 |
| Carbon dioxide | 4.0 |

Of course, the more expensive atmospheres such as hydrogen-nitrogen mixtures (discussed above) and cracked ammonia also may be used, if desired. The entire sintering operation, including preheating requires only 30 minutes.

After the sintering has been completed, the metallized area may be plated with nickel, copper or silver to facilitate the subsequent soldering or brazing operations.

From the foregoing, it will be apparent to those skilled in the art that my metallizing composition enables metallization of ceramics, particularly high refractory ceramics such as those containing in excess of about 85% alumina, at much lower sintering temperatures and in less expensive and less dangerous atmospheres. Furthermore, the use of lower temperatures enables less expensive furnaces to be used. Since the bonding process is not as sensitive to normal variations in production conditions, the metallized ceramic can be produced easier and with greater reliability. The increased bond strength produced by using my composition insures that the completed metal-ceramic or ceramic-ceramic seal will be free from leaks.

My invention may be embodied within the scope of the appended claims.

I claim:

1. A ceramic metallizing composition consisting essentially of: molybdenum boride, 40–70% by weight; manganese metal, 5–30% by weight; and cuprous oxide, 5–30% by weight.

2. A ceramic metallizing composition consisting essentially of: molybdenum boride, 40–70% by weight; manganese metal, 5–30% by weight; cuprous oxide, 5–30% by weight; and manganese dioxide, 0–15% by weight.

3. A ceramic metallizing composition consisting essentially of: molybdenum boride, substantially 60% by weight; manganese metal, substantially 15% by weight; cuprous oxide, substantially 15% by weight; and manganese dioxide, substantially 10% by weight.

4. A metallized ceramic comprising a ceramic member having a tightly adhering metal surface consisting of molybdenum boride, 40–70% by weight, manganese metal, 5–30% by weight, cuprous oxide, 5–30% by weight, and manganese dioxide, 0–15% by weight.

References Cited in the file of this patent

UNITED STATES PATENTS

| | | |
|---|---|---|
| 2,802,748 | Glaser | Aug. 13, 1957 |
| 2,851,376 | Adlassing | Sept. 9, 1958 |